(12) United States Patent
Mitsushima et al.

(10) Patent No.: US 11,519,082 B2
(45) Date of Patent: Dec. 6, 2022

(54) ORGANIC HYDRIDE PRODUCTION APPARATUS AND METHOD FOR PRODUCING ORGANIC HYDRIDE

(71) Applicants: National University Corporation YOKOHAMA National University, Yokohama (JP); DE NORA PERMELEC LTD, Fujisawa (JP)

(72) Inventors: Shigenori Mitsushima, Yokohama (JP); Kensaku Nagasawa, Yokohama (JP); Yoshinori Nishiki, Fujisawa (JP); Akihiro Kato, Fujisawa (JP); Setsuro Ogata, Fujisawa (JP); Awaludin Zaenal, Fujisawa (JP); Akiyoshi Manabe, Fujisawa (JP); Koji Matsuoka, Tokyo (JP); Yasushi Sato, Tokyo (JP)

(73) Assignees: NATIONAL UNIVERSITY CORPORATION YOKOHAMA NATIONAL UNIVERSITY, Yokohama (JP); DE NORA PERMELEC LTD., Fujisawa (JP)

( * ) Notice: Subject to any disclaimer, the term of this patent is extended or adjusted under 35 U.S.C. 154(b) by 105 days.

(21) Appl. No.: 16/412,957

(22) Filed: May 15, 2019

(65) Prior Publication Data
US 2019/0264340 A1 Aug. 29, 2019

Related U.S. Application Data

(63) Continuation of application No. PCT/JP2017/037647, filed on Oct. 18, 2017.

(30) Foreign Application Priority Data

Nov. 15, 2016 (JP) .............................. JP2016-222563

(51) Int. Cl.
C25B 3/25 (2021.01)
C25B 15/08 (2006.01)
(Continued)

(52) U.S. Cl.
CPC ................. *C25B 3/25* (2021.01); *C25B 9/00* (2013.01); *C25B 9/19* (2021.01); *C25B 9/23* (2021.01); *C25B 15/08* (2013.01)

(58) Field of Classification Search
CPC .... C25B 3/25; C25B 1/04; C25B 9/00; C25B 9/19; C25B 9/23; C25B 9/73; C25B 15/08
See application file for complete search history.

(56) References Cited

U.S. PATENT DOCUMENTS 3,288,692 A * 11/1966 Leduc .................. C07D 301/14
204/263
4,584,070 A    4/1986 Delue et al.
(Continued)

FOREIGN PATENT DOCUMENTS

CN    1272460 A    11/2000
CN    1680628 A    10/2005
(Continued)

OTHER PUBLICATIONS

Office Action dated Jan. 2, 2021, by the Korean Patent Office in corresponding Korean Patent Application No. 10-2019-7016798 and English translation of the Office Action. (16 pages).
(Continued)

*Primary Examiner* — Ciel P Contreras
(74) *Attorney, Agent, or Firm* — Buchanan Ingersoll & Rooney PC

(57) ABSTRACT

An organic hydride production apparatus includes: an electrolyte membrane having proton conductivity; a cathode that includes a cathode catalyst layer used to hydrogenate a
(Continued)

hydrogenation target substance using protons to produce an organic hydride and also includes a cathode chamber; an anode that includes an anode catalyst layer used to oxidize water to produce protons and also includes an anode chamber; and a gas introduction unit that introduces, into the anolyte at a certain position, a certain gas used to remove at least one of the hydrogenation target substance and the organic hydride that have passed through the electrolyte membrane and been mixed into the anolyte.

6 Claims, 6 Drawing Sheets

(51) Int. Cl.
  *C25B 9/00*  (2021.01)
  *C25B 9/19*  (2021.01)
  *C25B 9/23*  (2021.01)

(56) References Cited

U.S. PATENT DOCUMENTS

| | | | | |
|---|---|---|---|---|
| 5,213,665 | A * | 5/1993 | Sugishima | C07C 221/00 205/436 |
| 2002/0070123 | A1 * | 6/2002 | Andrews | C25B 1/13 205/626 |
| 2009/0000574 | A1 * | 1/2009 | Sugimasa | F02M 25/12 123/3 |
| 2012/0067021 | A1 * | 3/2012 | Aggelopoulos | F02M 25/12 60/39.12 |
| 2012/0247970 | A1 * | 10/2012 | Olson | C25B 9/19 205/508 |
| 2013/0001098 | A1 | 1/2013 | Friesen et al. | |
| 2013/0313127 | A1 | 11/2013 | Sato et al. | |
| 2014/0144774 | A1 | 5/2014 | Hirashige et al. | |
| 2015/0008138 | A1 | 1/2015 | Sato et al. | |
| 2015/0114842 | A1 | 4/2015 | Sato et al. | |
| 2016/0010223 | A1 | 1/2016 | Sato et al. | |
| 2016/0177459 | A1 | 6/2016 | Sato et al. | |
| 2016/0177460 | A1 | 6/2016 | Sato et al. | |
| 2016/0281246 | A1 * | 9/2016 | Lilga | C25B 9/19 |
| 2017/0314145 | A1 | 11/2017 | Mitsushima et al. | |
| 2018/0202056 | A1 * | 7/2018 | Park | B01D 53/326 |

FOREIGN PATENT DOCUMENTS

| | | |
|---|---|---|
| CN | 101333667 A | 12/2008 |
| CN | 101589176 A | 11/2009 |
| CN | 101660171 A | 3/2010 |
| CN | 103069051 A | 4/2013 |
| CN | 104141148 A | 11/2014 |
| CN | 104204304 A | 12/2014 |
| CN | 104471114 A | 3/2015 |
| CN | 204958480 U | 1/2016 |
| CN | 105420751 A | 3/2016 |
| CN | 105568310 A | 5/2016 |
| JP | H08-000759 A | 1/1996 |
| JP | 2015-227258 A | 12/2015 |
| JP | 2016-098410 A | 5/2016 |
| WO | 2012/091128 A1 | 7/2012 |
| WO | 2014/156125 A1 | 10/2014 |
| WO | 2015/029367 A1 | 3/2015 |

OTHER PUBLICATIONS

Shaolong et al., "The Influence of Electrolytic Condition on Physicochemical Properties of Alkaline Reduced Water", China Academic Journal Electronic Publishing House, Sep. 16, 2015, vol. 41, No. 9, pp. 49-52.

Sakurai et al., "Fundamental Study of Water Electrolysis for Life Support System in Space", Electrochimica Acta, Jun. 15, 2013, p. 24.

Office Action dated Sep. 21, 2020, by the Chinese Patent Office in corresponding Chinese Patent Application No. 201780070492.3 and English translation of the Office Action. (25 pages).

Extended European Search Report dated May 26, 2020, issued by the European Patent Office in corresponding European Application No. 17871502.5 (6 pages).

Office Action/Examination Search Report dated Aug. 10, 2020, by the Canadian Patent Office in corresponding Canadian Patent Application No. 3,042,601. (3 pages).

English language translation of International Preliminary Report on Patentability (Form PCT/IB/373) and the Written Opinion of the International Searching Authority (Form PCT/ISA/237) dated May 21, 2019, in the corresponding International Application No. PCT/JP2017/037647. (9 pages).

International Search Report (Form PCT/ISA/210) dated Jan. 16, 2018, in the corresponding International Application No. PCT/JP2017/037647. (5 pages).

\* cited by examiner

ORGANIC HYDRIDE PRODUCTION APPARATUS AND METHOD FOR PRODUCING ORGANIC HYDRIDE

CROSS-REFERENCE TO RELATED APPLICATIONS

This application is based upon and claims the benefit of priority from the prior Japanese Patent Application No. 2016-222563, filed on Nov. 15, 2016, and International Patent Application No. PCT/JP2017/037647, filed on Oct. 18, 2017, the entire content of each of which is incorporated herein by reference.

BACKGROUND

Field of the Invention

The present invention relates to an organic hydride production apparatus and a method for producing an organic hydride. The present invention particularly relates to an organic hydride production apparatus for producing an organic hydride by electrochemically hydrogenating a hydrogenation target substance, and to a method for producing an organic hydride using the organic hydride production apparatus.

Description of the Related Art

In recent years, widespread use of renewable energy, obtained by solar power generation, wind power generation, hydropower generation, geothermal power generation, and the like, is desired because the renewable energy is considered as new energy that can be generated with less carbon dioxide emissions, compared to energy obtained by thermal power generation. However, for such renewable energy, moderation of output fluctuations, especially the intermediate and long-period output fluctuations, is required. Also, large-scale transportation of renewable energy is relatively difficult. Meanwhile, electric power obtained from renewable energy can be effectively converted into chemical energy. For processes for directly converting electric power into chemical energy, electrochemical systems can be used. Secondary cells, or storage batteries, are examples of electrochemical systems and are devices widely used to convert electrical power into chemical energy and store the chemical energy.

As an electrochemical system based on renewable energy, there is a promising system in which large-scale solar power or wind power generation systems are installed in appropriate locations around the world, and renewable energy obtained therefrom is converted into an energy carrier appropriate for transportation, so as to be transported into a country and consumed domestically. The energy carrier may be liquid hydrogen, for example. However, since hydrogen is gaseous at ordinary temperatures and pressures, special tankers are required for transportation and storage thereof.

In such a situation, attention is given to organic hydrides (organic chemical hydrides) as energy carriers alternative to liquid hydrogen. Organic hydrides may be cyclic organic compounds, such as cyclohexane, methylcyclohexane, and decalin. Organic hydrides are generally liquid at ordinary temperatures and pressures, and hence can be easily handled. Also, organic hydrides can be electrochemically hydrogenated and dehydrogenated. Accordingly, when an organic hydride is used as an energy carrier, it can be transported and stored more easily than liquid hydrogen.

Particularly, when a liquid organic hydride having properties similar to those of petroleum is selected, since it has excellent compatibility with relatively large-scale energy supply systems, the liquid organic hydride has the advantage of being easily distributed to ends of such energy supply systems.

As a method for producing an organic hydride, a method is conventionally known in which hydrogen is produced by water electrolysis using renewable energy and is added to a hydrogenation target substance (dehydrogenated product of an organic hydride) in a hydrogenation reactor, thereby producing an organic hydride.

Meanwhile, when an electrolytic synthesis method is used, since hydrogen can be directly added to a hydrogenation target substance, the processes for organic hydride production can be simplified. In addition, the efficiency loss is small regardless of the production scale, and excellent responsiveness to the start and stop operations of the organic hydride production apparatus can be seen. With regard to a technology for such organic hydride production, for example, Patent Document 1 discloses an electrolysis cell that includes an oxidizing electrode for producing protons from water, and a reducing electrode for hydrogenating an organic compound having an unsaturated bond.

Patent Document 1: WO 12/091128

As a result of intensive study regarding the abovementioned technology for organic hydride production, the inventors have found that there is room for improving the efficiency of organic hydride production in the conventional technologies.

SUMMARY OF THE INVENTION

The present invention has been made in view of such a situation, and a purpose thereof is to provide a technology for improving efficiency of organic hydride production.

One aspect of the present invention is an organic hydride production apparatus. The apparatus includes: an electrolyte membrane having proton conductivity; a cathode, provided on one side of the electrolyte membrane, that includes a cathode catalyst layer used to hydrogenate a hydrogenation target substance using protons to produce an organic hydride and also includes a cathode chamber that houses the cathode catalyst layer; an anode, provided opposite to the one side of the electrolyte membrane, that includes an anode catalyst layer used to oxidize water in an anolyte to produce protons and also includes an anode chamber that houses the anode catalyst layer; and a gas introduction unit that introduces, into the anolyte at a predetermined position, a predetermined gas used to remove at least one of the hydrogenation target substance and the organic hydride that have passed through the electrolyte membrane and been mixed into the anolyte.

Another aspect of the present invention is a method for producing an organic hydride. The method includes: supplying an anolyte containing water to an anode catalyst layer and producing protons by electrolysis of the water; supplying a hydrogenation target substance to a cathode catalyst layer and hydrogenating the hydrogenation target substance using the protons that have passed through an electrolyte membrane, thereby producing an organic hydride; and introducing a predetermined gas into the anolyte and removing, from the anolyte, at least one of the hydrogenation target substance and the organic hydride that have passed through the electrolyte membrane and been mixed into the anolyte.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
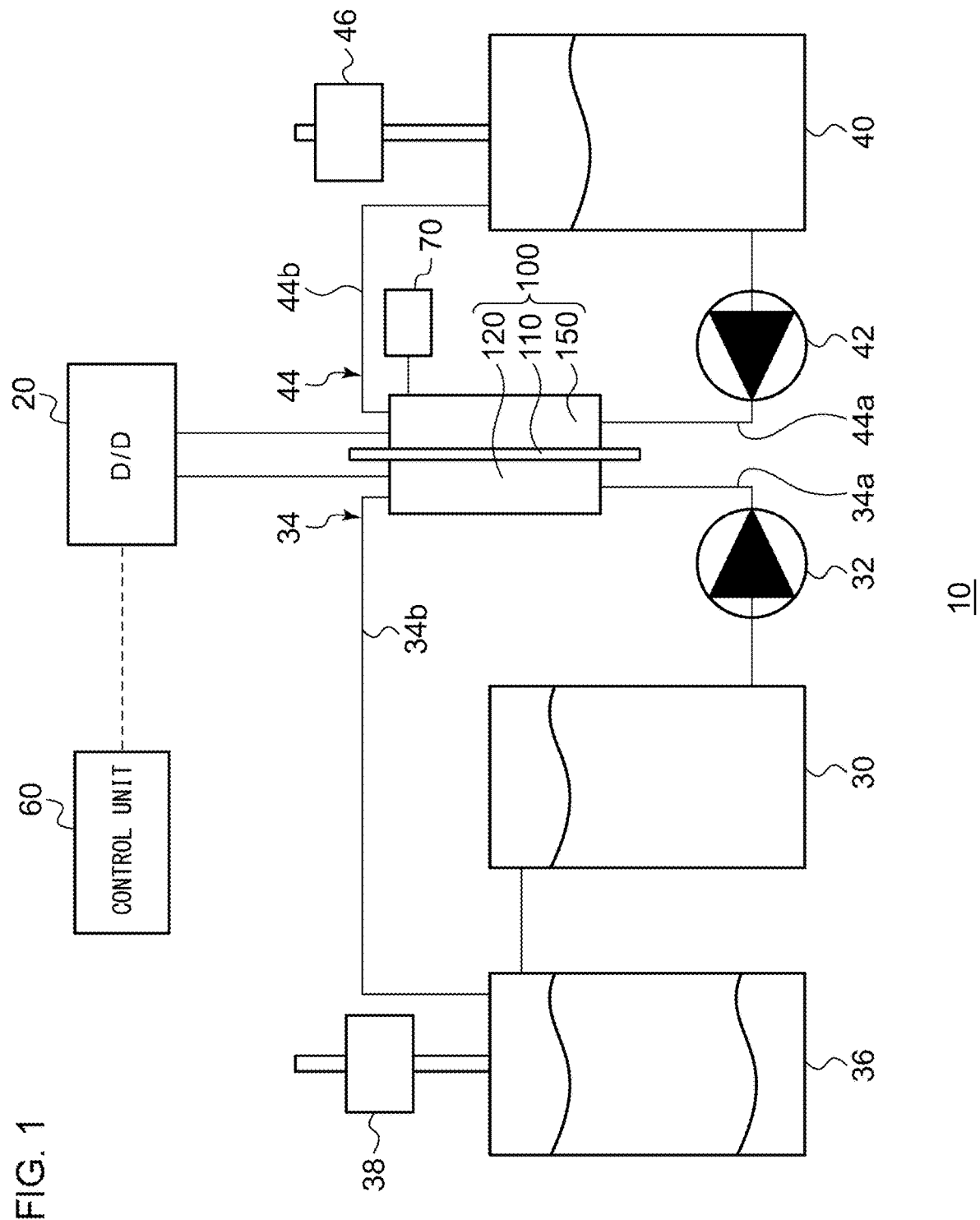
FIG. 1 is a schematic diagram of an organic hydride production apparatus according to an embodiment.

In the following, the present invention will be described based on a preferred embodiment with reference to the drawings. Embodiments of the invention are provided for purposes of illustration and not limitation, and it should be understood that not all of the features or combinations thereof described in the embodiments are necessarily essential to the invention.

Like reference characters denote like or corresponding constituting elements, members, and processes in each drawing, and repetitive description will be omitted as appropriate. Also, the scale or shape of each component shown in each drawing is set for the sake of convenience to facilitate the explanation and is not to be regarded as limitative unless otherwise specified. Further, when the terms "first", "second", and the likes are used in the present specification or claims, such terms do not imply any order or importance and are used to distinguish one configuration from another, unless otherwise specified.

FIG. 1 is a schematic diagram of an organic hydride production apparatus (electrochemical reduction apparatus) according to an embodiment. In FIG. 1, illustration of separators included in the electrolysis cell is omitted to simplify the configuration of the membrane electrode assembly. An organic hydride production apparatus 10 is an apparatus for hydrogenating a hydrogenation target substance, which is a dehydrogenated product of an organic hydride, by an electrochemical reduction reaction, and the organic hydride production apparatus 10 mainly includes an electrolysis cell 100 for organic hydride production (hereinafter, the "electrolysis cell for organic hydride production" may be simply referred to as the "electrolysis cell" as appropriate), an electric power controller 20, a catholyte storage tank 30, a separation tank 36, an anolyte storage tank 40, a control unit 60, and a gas introduction unit 70.

The electric power controller 20 may be a DC/DC converter for converting an output voltage of an electric power source into a predetermined voltage, for example. The positive output terminal of the electric power controller 20 is connected to an anode 150 (electrode for oxygen evolution) of the electrolysis cell 100. Also, the negative output terminal of the electric power controller 20 is connected to a cathode 120 (reduction electrode) of the electrolysis cell 100. Accordingly, a predetermined voltage is applied between the anode 150 and the cathode 120 of the electrolysis cell 100.

In the electric power controller 20, a reference terminal may be provided in order to detect the potentials of the positive and negative electrodes. In this case, the input side of the reference terminal is connected to a reference electrode (not illustrated) provided in an electrolyte membrane 110 of the electrolysis cell 100. The reference electrode is electrically isolated from the cathode 120 and the anode 150. The reference electrode is maintained at a reference electrode potential. The reference electrode potential in the subject application means a potential with respect to a reversible hydrogen electrode (RHE) (the reference electrode potential=0 V). Also, the reference electrode potential may be a potential with respect to an Ag/AgCl electrode (the reference electrode potential=0.199 V). The current flowing between the cathode 120 and the anode 150 is detected by a current detector (not illustrated). The current value detected by the current detector is input to the control unit 60 and used for control of the electric power controller 20 by the control unit 60. The potential difference between the reference electrode and the cathode 120 is detected by a voltage detector (not illustrated). The potential difference value detected by the voltage detector is input to the control unit 60 and used for control of the electric power controller 20 by the control unit 60.

The control unit 60 controls outputs at the positive output terminal and the negative output terminal of the electric power controller 20 such that the potentials of the anode 150 and the cathode 120 become desired potentials. The electric power source may preferably be renewable energy obtained by solar power generation, wind power generation, hydropower generation, geothermal power generation, and the like, but is not particularly limited thereto.

The catholyte storage tank 30 stores a hydrogenation target substance to be hydrogenated by an electrochemical reduction reaction in the electrolysis cell 100. An organic hydride used in the present embodiment is not particularly limited, as long as it is an organic compound that can be hydrogenated or dehydrogenated by a reversible hydrogenation or dehydrogenation reaction. Accordingly, acetone-isopropanol-based organic hydrides, benzoquinone-hydroquinone-based organic hydrides, aromatic hydrocarbon-based organic hydrides, and the likes may be widely used. Among them, aromatic hydrocarbon-based organic hydrides, represented by toluene-methylcyclohexane-based organic hydrides, may be preferable, in terms of transportability during the energy transportation, toxicity, safety, and storage stability, and also in terms of the transportable amount of hydrogen per volume or mass, ease of hydrogenation and dehydrogenation reactions, and energy conversion efficiency, including the feature by which the Gibbs free energy does not change significantly.

An aromatic hydrocarbon compound used as a dehydrogenated product of an organic hydride is a compound that contains at least one aromatic ring, such as benzene and an alkylbenzene. Alkylbenzenes include compounds in which one through four hydrogen atoms in an aromatic ring is replaced by a linear or branched alkyl group having one or two carbon atoms, such as toluene and xylene. Each of the compounds may be used solely or in combination. The aromatic hydrocarbon compound may preferably be at least one of toluene and benzene. As the dehydrogenated product, a nitrogen-containing heterocyclic aromatic compound, such as pyridine, pyrimidine, and pyrazine, may also be used. The organic hydride is obtained by hydrogenating a dehydrogenated product as set forth above and may be methylcyclohexane, dimethylcyclohexane, or piperidine, for example.

The dehydrogenated product of an organic hydride, i.e., the hydrogenation target substance, may preferably be liquid at ordinary temperatures. When a mixture of a plurality of the aforementioned aromatic hydrocarbon compounds, of a plurality of nitrogen-containing heterocyclic aromatic compounds, or of the both compounds is used, such a mixture may suitably be liquid. When the hydrogenation target substance is liquid at ordinary temperatures, such a hydrogenation target substance in the liquid state can be supplied to the electrolysis cell 100, without performing a process such as heating and pressurization thereon. Accordingly, the configuration of the organic hydride production apparatus 10 can be simplified. In the following, the liquid stored in the catholyte storage tank 30 may be referred to as the "catholyte", as needed.

The hydrogenation target substance stored in the catholyte storage tank 30 is supplied to the cathode 120 of the electrolysis cell 100 by a first liquid supply device 32. As the first liquid supply device 32, each of various pumps, such as a gear pump and a cylinder pump, or a gravity flow type device can be used, for example. Between the cathode 120 and the catholyte storage tank 30, a circulation passage 34 is provided. The circulation passage 34 includes an outward part 34a that connects the catholyte storage tank 30 and the cathode 120 on the upstream side of the cathode 120 in the catholyte flow direction, and a return part 34b that connects the cathode 120 and the catholyte storage tank 30 on the downstream side of the cathode 120 in the catholyte flow direction. On the outward part 34a, the first liquid supply device 32 is provided. Also, on the return part 34b, the separation tank 36 is provided.

The hydrogenation target substance hydrogenated in the electrolysis cell 100, i.e., an organic hydride, and the unreacted hydrogenation target substance flow through the return part 34b of the circulation passage 34 to reach the separation tank 36. In the separation tank 36, hydrogen gas as a by-product, the anolyte flowing into the cathode 120 side via the electrolyte membrane 110, or the like is separated from the mixture of the organic hydride and the hydrogenation target substance. The separated gas is processed in a decomposition unit 38 containing a decomposition catalyst or the like. The separated anolyte is reused. The organic hydride and the hydrogenation target substance are then returned into the catholyte storage tank 30.

The anolyte storage tank 40 stores ion exchanged water, pure water, or an aqueous solution obtained by adding acid, such as sulfuric acid, phosphoric acid, nitric acid, and hydrochloric acid, to ion exchanged water or pure water, for example (hereinafter, referred to as the "anolyte", as needed). The ion conductivity of the anolyte measured at 20 degrees C. may preferably be 0.01 S/cm or greater. By setting the ion conductivity of the anolyte to 0.01 S/cm or greater, industrially sufficient electrochemical reactions can be induced.

The anolyte stored in the anolyte storage tank 40 is supplied to the anode 150 of the electrolysis cell 100 by a second liquid supply device 42. As the second liquid supply device 42, each of various pumps, such as a gear pump and a cylinder pump, or a gravity flow type device can be used, for example. Between the anode 150 and the anolyte storage tank 40, a circulation passage 44 that connects the anode 150 and the anolyte storage tank 40 is provided. The circulation passage 44 includes an outward part 44a that connects the anolyte storage tank 40 and the anode 150 on the upstream side of the anode 150 in the anolyte flow direction, and a return part 44b that connects the anode 150 and the anolyte storage tank 40 on the downstream side of the anode 150 in the anolyte flow direction. On the outward part 44a, the second liquid supply device 42 is provided. In other words, the organic hydride production apparatus 10 includes an anolyte supply line, constituted by the anolyte storage tank 40 and the circulation passage 44, for supplying an anolyte containing water to the anode 150.

The unreacted anolyte in the electrolysis cell 100 is returned to the anolyte storage tank 40 via the return part 44b of the circulation passage 44. In the anolyte storage tank 40, a gas-liquid separation unit (not illustrated) is provided, so that oxygen produced by electrolysis of the anolyte in the electrolysis cell 100, and gases, such as the gasified hydrogenation target substance and organic hydride, mixed into the anolyte via the electrolyte membrane 110 are separated from the anolyte in the gas-liquid separation unit and then processed in a decomposition unit 46 containing a decomposition catalyst or an adsorbent, for example. When a sulfuric acid aqueous solution or the like is used as the anolyte, the material of the anolyte storage tank 40 may preferably be polyvinyl chloride, polyethylene, polypropylene, or fiber-reinforced plastic, for example. Also, the component parts of the drive unit of the second liquid supply device 42 may preferably be coated with ceramics, fluororesin, or the like.

Figure 2:
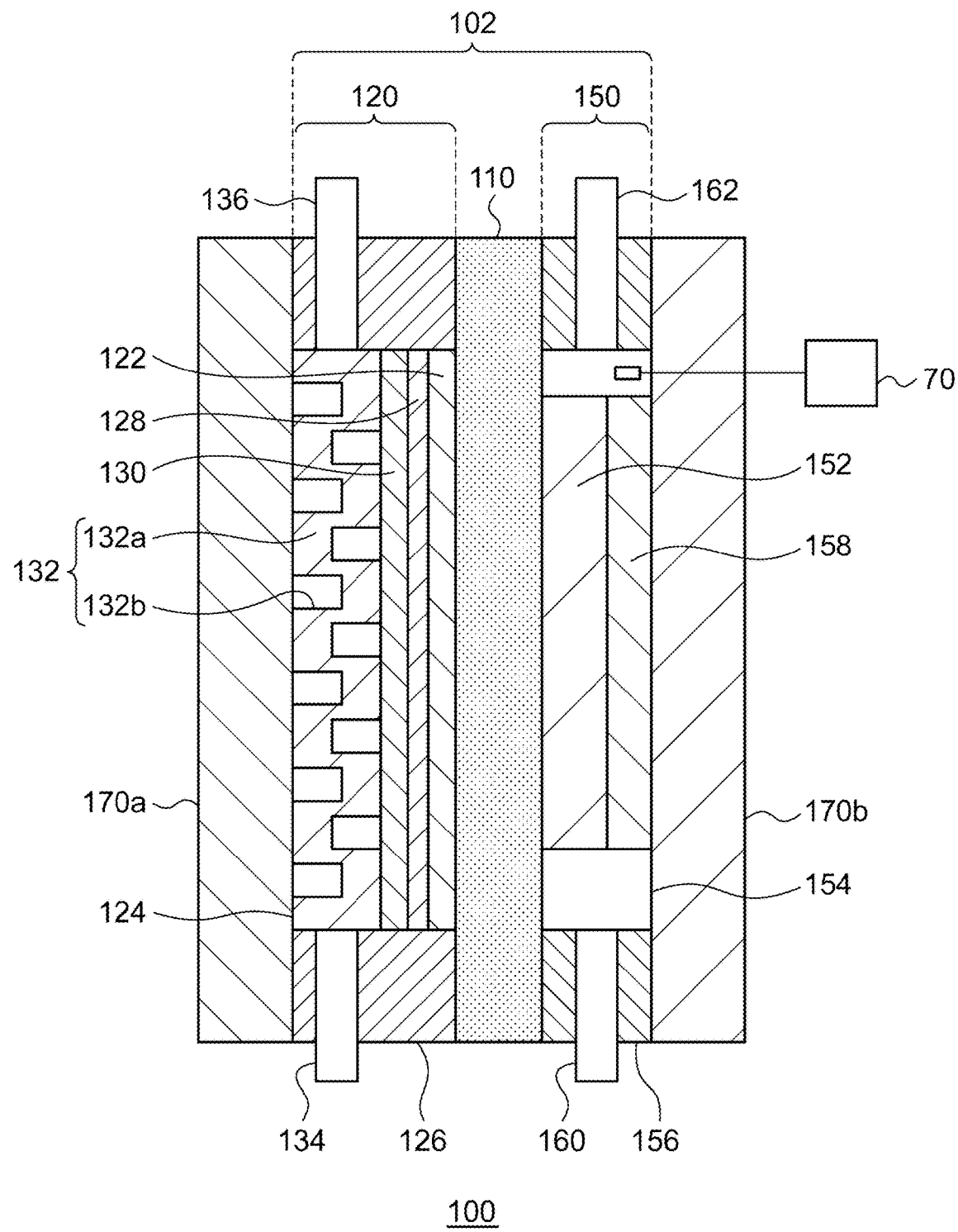
FIG. 2 is a sectional view that shows a schematic structure of an electrolysis cell included in the organic hydride production apparatus according to the embodiment.

The electrolysis cell 100 includes the electrolyte membrane 110, the cathode 120, and the anode 150. FIG. 2 is a sectional view that shows a schematic structure of the electrolysis cell included in the organic hydride production apparatus according to the embodiment. As shown in FIG. 2, the electrolysis cell 100 includes a membrane electrode assembly 102 and a pair of separators 170a and 170b between which the membrane electrode assembly 102 is disposed. The membrane electrode assembly 102 includes the electrolyte membrane 110, the cathode 120, and the anode 150.

[Electrolyte Membrane]

The electrolyte membrane 110 is formed of a proton-conducting material (an ionomer). The electrolyte membrane 110 selectively conducts protons while restraining mixture and diffusion of substances between the cathode 120 and the anode 150. The proton-conducting material may be a perfluorosulfonic acid polymer, such as Nafion (registered trademark) and Flemion (registered trademark). The thickness of the electrolyte membrane 110 is not particularly limited, but may preferably be 5-300 µm, more preferably be 10-200 µm, and further preferably be 20-100 µm. By setting the thickness of the electrolyte membrane 110 to 5 µm or greater, the barrier performance of the electrolyte membrane 110 can be ensured, so that cross leakage of the hydrogenation target substance, organic hydride, oxygen, and the like can be restrained more certainly. Also, setting the thickness of the electrolyte membrane 110 to 300 µm or less can prevent excessive increase of ion transfer resistance.

The area resistance, i.e., ion transfer resistance per geometric area, of the electrolyte membrane 110 is not particularly limited, but may preferably be 2000 mΩ·cm$^2$ or less, more preferably be 1000 mΩ·cm$^2$ or less, and further preferably be 500 mΩ·cm$^2$ or less. By setting the area resistance of the electrolyte membrane 110 to 2000 mΩ·cm$^2$ or less, lack of proton conductivity can be prevented more certainly.

The ion exchange capacity (IEC) of the cation-exchange ionomer is not particularly limited, but may preferably be 0.7-2 meq/g, and more preferably be 1-1.3 meq/g. By setting the ion exchange capacity of the cation-exchange ionomer to 0.7 meq/g or greater, insufficiency of ion conductivity can be prevented more certainly. Also, setting the ion exchange capacity to 2 meq/g or less can more certainly prevent insufficiency of the strength of the electrolyte membrane 110 caused by increase of solubility of the ionomer in the anolyte, hydrogenation target substance, or organic hydride.

The electrolyte membrane 110 may be mixed with a reinforcement material, such as porous polytetrafluoroethylene (PTFE). Adding a reinforcement material can restrain deterioration of dimension stability of the electrolyte membrane 110 caused by increase of the ion exchange capacity. Accordingly, durability of the electrolyte membrane 110 can be improved. Also, crossover of the hydrogenation target substance, organic hydride, oxygen, and the like can be restrained. A surface of the electrolyte membrane 110 may be made hydrophilic by providing asperities on the surface, coating the surface with a predetermined inorganic layer, or the combination thereof.

[Cathode]

The cathode 120 is provided on one side of the electrolyte membrane 110. In the present embodiment, the cathode 120 is provided to be in contact with one main surface of the electrolyte membrane 110. The cathode 120 includes a cathode catalyst layer 122, and a cathode chamber 124 that houses the cathode catalyst layer 122. The cathode 120 also includes a spacer 126, a microporous layer 128, a diffusion layer 130, a flow passage part 132, a cathode chamber inlet 134, and a cathode chamber outlet 136.

The cathode catalyst layer 122 is in contact with one main surface of the electrolyte membrane 110 in the cathode chamber 124. The cathode catalyst layer 122 contains a reduction catalyst used to hydrogenate a hydrogenation target substance using protons to produce an organic hydride. As the reduction catalyst, metal particles of a substance selected from a group including Pt, Ru, Pd, Ir, and an alloy containing at least one of them may be used. The reduction catalyst may be a commercially available product, or may be synthesized according to a publicly-known method. Also, the reduction catalyst may be constituted by a metal composition that contains a first catalyst metal (noble metal) including at least one of Pt, Ru, Pd, and Ir, and one or more kinds of second catalyst metals selected from among Cr, Mn, Fe, Co, Ni, Cu, Zn, Mo, Ru, Sn, W, Re, Pb, and Bi. In this case, the form of the metal composition may be an alloy of the first catalyst metal and the second catalyst metal(s), or an intermetallic compound constituted by the first catalyst metal and the second catalyst metal(s), for example.

The average particle size of the reduction catalyst may preferably be 1 nm-1 μm, and more preferably be 1-5 nm. By setting the average particle size of the reduction catalyst to 1 μm or less, the surface area per weight (reactive area) of the catalyst can be increased. Also, setting the average particle size of the reduction catalyst to 1 nm or greater can more certainly restrain deterioration of the durability caused by the proceeding of catalyst particle cohesion.

The reduction catalyst is supported by a catalyst support made of an electron-conductive material. When the reduction catalyst is supported by a catalyst support, the surface area of the cathode catalyst layer 122 can be increased. Also, cohesion of the reduction catalyst can be restrained. The electron conductivity of the electron-conductive material used for the catalyst support may preferably be $1.0 \times 10^{-2}$ S/cm or greater, more preferably be $3.0 \times 10^{-2}$ S/cm or greater, and further preferably be $1.0 \times 10^{-1}$ S/cm or grater. By setting the electron conductivity of the electron-conductive material to $1.0 \times 10^{-2}$ S/cm or greater, the electron conductive properties can be more certainly imparted to the cathode catalyst layer 122.

For the catalyst support, an electron-conductive material containing, as a major component, one of porous carbon (such as mesoporous carbon), porous metal, and a porous metal oxide may be used, for example. The porous carbon may be carbon black, for example, including Ketjenblack (registered trademark), acetylene black, furnace black, and Vulcan (registered trademark).

The BET specific surface area of the porous carbon measured by a nitrogen adsorption method may preferably be 50-1500 $m^2$/g, more preferably be 500-1300 $m^2$/g, and further preferably be 700-1000 $m^2$/g. By setting the BET specific surface area of the porous carbon to 50 $m^2$/g or greater, the reduction catalyst can be evenly supported more easily. Also, the diffusivity of the hydrogenation target substance or organic hydride can be ensured more certainly. Also, setting the BET specific surface area of the porous carbon to 1500 $m^2$/g or less can prevent the catalyst support becoming likely to deteriorate during a reaction of the hydrogenation target substance or when the organic hydride production apparatus 10 is started or stopped. Accordingly, sufficient durability can be imparted to the catalyst support. The average particle size of carbon particulates, such as carbon black, used as the catalyst support may preferably be 0.01-1 μm.

The porous metal may be Pt black, Pd black, or Pt metal deposited in a fractal form, for example. The porous metal oxide may be an oxide of Ti, Zr, Nb, Mo, Hf, Ta, or W, for example. Also, for the catalyst support, a porous metal compound, such as a nitride, a carbide, an oxynitride, a carbonitride, or a partially-oxidized carbonitride of metal, such as Ti, Zr, Nb, Mo, Hf, Ta, and W, may also be used (hereinafter, such a porous metal compound may be referred to as a "porous metal carbonitride or the like" as appropriate). The BET specific surface area of the porous metal, the porous metal oxide, and the porous metal carbonitride or the like measured by a nitrogen adsorption method may preferably be 1 $m^2$/g or greater, more preferably be 3 $m^2$/g or greater, and further preferably be 10 $m^2$/g or greater. By setting the BET specific surface area of the porous metal, the porous metal oxide, and the porous metal carbonitride or the like to 1 $m^2$/g or greater, the reduction catalyst can be evenly supported more easily.

The catalyst support supporting the reduction catalyst is coated with an ionomer. Accordingly, the ion conductivity of the cathode 120 can be improved. The ionomer may be a perfluorosulfonic acid polymer, for example, including Nafion (registered trademark) and Flemion (registered trademark). The ion exchange capacity (IEC) of the ionomer may preferably be 0.7-3 meq/g, more preferably be 1-2.5 meq/g, and further preferably be 1.2-2 meq/g. When the catalyst support is porous carbon, a mass ratio I/C of the ionomer (I) to the catalyst support (C) may preferably be 0.1-2, more preferably be 0.2-1.5, and further preferably be 0.3-1.1. By setting the mass ratio I/C to 0.1 or greater, sufficient ion conductivity can be obtained more certainly. Also, setting the mass ratio I/C to 2 or less can prevent excessive thickening of the ionomer coating for the reduction catalyst, so that the situation can be avoided in which the hydrogenation target substance is inhibited from coming into contact with a catalytic active site.

Preferably, the reduction catalyst may be partially coated with the ionomer included in the cathode catalyst layer 122. This enables efficient supply of three elements (a hydrogenation target substance, protons, and electrons) necessary for the electrochemical reaction in the cathode catalyst layer 122, to a reaction field.

The thickness of the cathode catalyst layer 122 may preferably be 1-100 μm, and more preferably be 5-30 μm. If the thickness of the cathode catalyst layer 122 is increased, the proton transfer resistance will be increased, and, in addition, the diffusivity of the hydrogenation target substance or organic hydride will be reduced. Therefore, adjusting the thickness of the cathode catalyst layer 122 within the abovementioned range would be desirable.

The cathode catalyst layer 122 may be prepared by the following method, for example. First, catalyst component powder, hydrophobic resin (fluorine component) of a gas-permeable material, water, a solvent such as naphtha, and an ionomer {such as Nafion (registered trademark) Dispersion Solution DE521 (made by E. I. du Pont de Nemours and Company)} are mixed together. The amount of the ionomer added may preferably be set such that the ratio of the mass of the ionomer after drying to the mass of carbon in the catalyst component powder is 1:10-10:1. The hydrophobic resin is powdery, and the particle size thereof may preferably be 0.005-10 μm. To the obtained mixture, a solvent is added as appropriate, so as to prepare catalyst ink.

Thereafter, the catalyst ink thus obtained is applied to the microporous layer 128, and drying and hot pressing is performed such that the cathode catalyst layer 122 is fixed to the microporous layer 128. Preferably, applying the catalyst ink and drying as stated above may be performed divisionally in multiple times before hot pressing is performed. This can make the cathode catalyst layer 122 to be obtained more homogenous. Through the process set forth above, the cathode catalyst layer 122 can be prepared. The cathode catalyst layer 122 may be formed on the electrolyte membrane 110. For example, by applying the catalyst ink to one main surface of the electrolyte membrane 110 using a bar coater, a complex of the cathode catalyst layer 122 and the electrolyte membrane 110 can be prepared. Also, by applying the catalyst ink to one main surface of the electrolyte membrane 110 by spray coating and drying the solvent component in the catalyst ink, a complex of the cathode catalyst layer 122 and the electrolyte membrane 110 can be prepared. The catalyst ink may be preferably applied such that the mass of the reduction catalyst in the cathode catalyst layer 122 per electrode area is 0.5 mg/cm$^2$.

The cathode chamber 124 is defined by the electrolyte membrane 110, the separator 170a, and the spacer 126 of a frame shape disposed between the electrolyte membrane 110 and the separator 170a. The cathode chamber 124 houses the microporous layer 128, the diffusion layer 130, and the flow passage part 132, besides the cathode catalyst layer 122. In the spacer 126, the cathode chamber inlet 134 and the cathode chamber outlet 136, which each communicate with the inside and the outside of the cathode chamber 124, are disposed.

The microporous layer 128 is disposed adjacent to the cathode catalyst layer 122. More specifically, the microporous layer 128 is provided to be in contact with a main surface of the cathode catalyst layer 122 opposite to the electrolyte membrane 110 side. The diffusion layer 130 is disposed adjacent to the microporous layer 128. More specifically, the diffusion layer 130 is provided to be in contact with a main surface of the microporous layer 128 opposite to the cathode catalyst layer 122 side.

The diffusion layer 130 has a function to evenly diffuse, in the cathode catalyst layer 122, the hydrogenation target substance in a liquid state supplied from the flow passage part 132. A constituent material of the diffusion layer 130 may preferably have high compatibility with the hydrogenation target substance and organic hydride. The constituent material of the diffusion layer 130 may be a porous conductive base material or a fiber sintered body, for example. Porous conductive base materials and fiber sintered bodies are preferable because they have porosity suitable for supply and removal of gas and liquid and are capable of maintaining sufficient conductivity. The diffusion layer 130 may preferably have a thickness of 10-5000 μm, percentage of voids of 30-95%, and representative pore size of 1-1000 μm. Also, the electron conductivity of the constituent material of the diffusion layer 130 may preferably be $10^{-2}$ S/cm or greater.

More specific examples of the constituent material of the diffusion layer 130 include carbon woven fabric (carbon cloth), carbon non-woven fabric, and carbon paper. Carbon cloth is woven fabric made with bundles of hundreds of thin carbon fibers of which the diameter is a few micrometers. Also, carbon paper is obtained by making a thin film precursor from carbon material fiber using a papermaking method and then sintering the thin film precursor.

The microporous layer 128 has a function to promote diffusion of the hydrogenation target substance and organic hydride in liquid states in a surface direction of the cathode catalyst layer 122. The microporous layer 128 may be formed by applying, to a surface of the diffusion layer 130, paste-like kneaded matter obtained by mixing and kneading conductive powder and a water repellent, and then drying the kneaded matter, for example. As the conductive powder, conductive carbon such as Vulcan (registered trademark) may be used, for example. As the water repellent, fluororesin such as polytetrafluoroethylene (PTFE) resin may be used, for example. The ratio between the conductive powder and water repellent may be appropriately determined within a range such that desired conductivity and water repellency can be obtained. As an example, when Vulcan (registered trademark) is used as the conductive powder and PTFE is used as the water repellent, the mass ratio (Vulcan:PTFE) may be 4:1-1:1, for example. As with the diffusion layer 130, the microporous layer 128 may also be formed of carbon cloth, carbon paper, or the like.

The mean flow pore size (dm) of the microporous layer 128 after hot pressing may preferably be 100 nm-20 μm, and more preferably be 500 nm-5 μm. The mean flow pore size of the microporous layer 128 can be measured using a mercury porosimeter, for example. Setting the mean flow pore size to 100 nm or greater can more certainly restrain increase of the diffusion resistance caused by excessive increase of the contact area between the wall surface of each pore and the liquid hydrogenation target substance or liquid organic hydride. Also, setting the mean flow pore size to 20 μm or less can more certainly restrain decrease of the fluidity caused by decrease of suction by capillary action for the liquid hydrogenation target substance and liquid organic hydride. Also, by setting the mean flow pore size to 100 nm-20 μm, the liquid hydrogenation target substance and liquid organic hydride can be smoothly suctioned or discharged by capillary action.

The thickness of the microporous layer 128 may preferably be 1-50 μm, and more preferably be 2-20 μm. When the microporous layer 128 is formed such as to be recessed inward from the surface of the diffusion layer 130, an average thickness of the microporous layer 128, including the recessed portion in the diffusion layer 130, is defined as the thickness of the microporous layer 128. A metal component may be coexistent on a surface of the microporous layer 128. This can improve the electron conductivity of the microporous layer 128 and make the current uniform.

The microporous layer 128 and the diffusion layer 130 are used in a state where pressure is applied thereto in the respective thickness directions. Accordingly, it will be unfavorable if such pressurization in the thickness directions during use changes the conductivity in the thickness directions. Therefore, the microporous layer 128 and the diffusion layer 130 may preferably be subjected to press working in advance. This can compress a carbon material in each layer, thereby improving and stabilizing the conductivity in a thickness direction in each layer. Also, the cathode 120 with a stable filling rate of 20-50% can be obtained.

Further, improving the degree of bonding between the cathode catalyst layer 122 and the microporous layer 128 also contributes to improvement of the conductivity of the cathode 120. Such improvement of the degree of bonding also improves the capability of supplying a raw material and the capability of removing a product. As a press-working apparatus, a publicly-known apparatus, such as a hot press and a hot roller, may be used. Also, the pressing conditions may preferably be the temperature of room temperature—360 degrees C., and the pressure of 0.1-5 MPa.

The flow passage part 132 is disposed adjacent to the diffusion layer 130. More specifically, the flow passage part 132 is provided to be in contact with a main surface of the diffusion layer 130 opposite to the microporous layer 128 side. The flow passage part 132 has a structure in which grooves 132b are provided on a main surface of a body part 132a of a plate shape. The grooves 132b constitute a flow passage for the hydrogenation target substance. The body part 132a is made of a conductive material. The flow passage part 132 also functions as a cathode support for positioning the cathode catalyst layer 122, microporous layer 128, and diffusion layer 130 within the cathode chamber 124.

The cathode chamber inlet 134 is disposed below the cathode chamber 124 in the vertical direction. One end of the cathode chamber inlet 134 is connected to the flow passage of the flow passage part 132, and the other end thereof is connected to the first liquid supply device 32 via the outward part 34a of the circulation passage 34. The hydrogenation target substance supplied from outside the cathode chamber 124 is introduced into the cathode chamber 124 through the cathode chamber inlet 134. The hydrogenation target substance introduced into the cathode chamber 124 is supplied to the cathode catalyst layer 122 via the grooves 132b of the flow passage part 132, the diffusion layer 130, and the microporous layer 128.

The cathode chamber outlet 136 is disposed above the cathode chamber 124 in the vertical direction. One end of the cathode chamber outlet 136 is connected to the flow passage of the flow passage part 132, and the other end thereof is connected to the return part 34b of the circulation passage 34. The organic hydride and the unreacted hydrogenation target substance within the cathode chamber 124 are discharged outside the cathode chamber 124 through the cathode chamber outlet 136.

The separator 170a is disposed on the cathode 120 side in the electrolysis cell 100. In the present embodiment, the separator 170a is laminated to a main surface of the flow passage part 132 opposite to the diffusion layer 130 side.

[Anode]

The anode 150 is provided opposite to the one side of the electrolyte membrane 110, i.e., opposite to the cathode 120. In the present embodiment, the anode 150 is provided to be in contact with the other main surface of the electrolyte membrane 110. The anode 150 includes an anode catalyst layer 152, and an anode chamber 154 that houses the anode catalyst layer 152. The anode 150 also includes a spacer 156, a supporting elastic body 158, an anode chamber inlet 160, and an anode chamber outlet 162.

The anode catalyst layer 152 is in contact with the other main surface of the electrolyte membrane 110 in the anode chamber 154. The anode catalyst layer 152 is a layer containing a catalyst used to oxidize water in an anolyte to produce protons. As the catalyst included in the anode catalyst layer 152, metal particles of a substance selected from a group including Ru, Rh, Pd, Ir, Pt, and an alloy containing at least one of them may be used.

The catalyst may be dispersedly supported by a metallic base material having electron conductivity, or such a metallic base material may be coated with the catalyst. Such a metallic base material may be metal fiber (the fiber diameter may be 10-30 μm, for example), a mesh (the mesh size may be 500-1000 μm, for example), a sintered metal porous body, a foam molded body (foam), expanded metal, or the like, made of metal, such as Ti, Cr, Mn, Fe, Co, Ni, Cu, Zn, Nb, Mo, Ta, and W, or an alloy composed primarily of such metal.

In consideration of the necessity of electrical conductivity sufficient to conduct current required for electrolysis, and the necessity of mechanical strength of the electrolysis cell 100, the base material used for the anode catalyst layer 152 may preferably be a plate-like material having a thickness of 0.1-2 mm. Also, in order to promote the supply of an anolyte without increase of resistance caused by bubbles, the base material may preferably be a porous body and have excellent corrosion resistance to the anolyte. As such a base material, titanium expanded mesh is widely used. The expanded mesh may preferably have short way of mesh of 0.1-4 mm, long way of mesh of 0.1-4 mm, and an aperture ratio of about 30-70%.

The anode chamber 154 is defined by the electrolyte membrane 110, the separator 170b, and the spacer 156 of a frame shape disposed between the electrolyte membrane 110 and the separator 170b. The anode chamber 154 houses the supporting elastic body 158, besides the anode catalyst layer 152. In the spacer 156, the anode chamber inlet 160 and the anode chamber outlet 162, which each communicate with the inside and the outside of the anode chamber 154, are disposed.

The supporting elastic body 158 is disposed adjacent to the anode catalyst layer 152. More specifically, the supporting elastic body 158 is provided to be in contact with a main surface of the anode catalyst layer 152 opposite to the electrolyte membrane 110 side. The supporting elastic body 158 has a function to bias the anode catalyst layer 152 toward the electrolyte membrane 110. By pressing the anode catalyst layer 152 onto the electrolyte membrane 110 using the supporting elastic body 158, the electrolytic properties of the electrolysis cell 100 can be improved. The supporting elastic body 158 may be constituted by, for example, a conductive member having an elastic body structure, such as a leaf spring structure and a coil structure. The supporting elastic body 158 may preferably have acid resistance. The constituent material of the supporting elastic body 158 may be titanium or a titanium alloy, for example. Specific examples of the elastic body structure include a V-shaped spring, a cross spring, a cushion coil spring, and a chatter fiber aggregation.

The anode chamber inlet 160 is disposed below the anode chamber 154 in the vertical direction. One end of the anode chamber inlet 160 is connected to the inside of the anode chamber 154, and the other end thereof is connected to the second liquid supply device 42 via the outward part 44a of the circulation passage 44. The anolyte supplied from outside the anode chamber 154 is introduced into the anode chamber 154 through the anode chamber inlet 160. The anolyte introduced into the anode chamber 154 is supplied to the anode catalyst layer 152 directly or via the supporting elastic body 158.

The anode chamber outlet 162 is disposed above the anode chamber 154 in the vertical direction. One end of the anode chamber outlet 162 is connected to the inside of the anode chamber 154, and the other end thereof is connected to the return part 44b of the circulation passage 44. Oxygen gas and the unreacted anolyte within the anode chamber 154 is discharged outside the anode chamber 154 through the anode chamber outlet 162.

The separator 170b is disposed on the anode 150 side in the electrolysis cell 100. In the present embodiment, the separator 170b is laminated to a main surface of the supporting elastic body 158 opposite to the anode catalyst layer 152 side.

In the electrolysis cell 100 having the structure set forth above, reactions that occur when toluene (TL) is used as the hydrogenation target substance are as follows. When toluene is used as the hydrogenation target substance, the organic hydride to be obtained is methylcyclohexane (MCH).

<Electrode Reaction at the Anode>

$$2H_2O \rightarrow O_2 + 4H^+ + 4e^-, E_0 = 1.23V$$

<Electrode Reaction at the Cathode>

$$TL + 6H^+ + 6e^- \rightarrow MCH, E_0 = 0.15V$$

<Total Reaction>

$$2TL + 6H_2O \rightarrow 2MCH + 3O_2$$

Thus, the electrode reaction at the anode 150 and the electrode reaction at the cathode 120 proceed in parallel. Protons ($H^+$) produced by electrolysis of water at the anode 150 are supplied to the cathode 120 via the electrolyte membrane 110. The protons supplied to the cathode 120 are used for hydrogenation of the hydrogenation target substance at the cathode 120. Accordingly, toluene is hydrogenated, so that methylcyclohexane is produced. Therefore, with the organic hydride production apparatus 10 according to the present embodiment, the electrolysis of water and the hydrogenation of the hydrogenation target substance can be performed in one step.

In the organic hydride production apparatus 10, the hydrogenation target substance and the organic hydride (organic compound) supplied to the cathode 120 are inhibited from moving to the anode 150 side by the electrolyte membrane 110. However, it is difficult to perfectly prevent the move of the hydrogenation target substance and organic hydride with the electrolyte membrane 110, so that part of the hydrogenation target substance and organic hydride pass through the electrolyte membrane 110 to reach the anode 150 and are mixed into the anolyte. The hydrogenation target substance and organic hydride mixed into the anolyte may be adsorbed by the anode catalyst layer 152. Also, such hydrogenation target substance and organic hydride may become oxides by electrolytic oxidation in the anode catalyst layer 152, which may promote corrosion of the anode catalyst layer 152. Accordingly, the hydrogenation target substance and organic hydride mixed into the anolyte would deteriorate the function of the anode catalyst layer 152, which may increase the cell voltage in the organic hydride production apparatus 10, for example. Thus, the efficiency of organic hydride production would be reduced.

Meanwhile, the organic hydride production apparatus 10 according to the present embodiment includes the gas introduction unit 70, as shown in FIGS. 1 and 2, for introducing a predetermined gas into the anolyte so as to remove at least one of the hydrogenation target substance and the organic hydride mixed in the anolyte. In the following, a configuration for removing both the hydrogenation target substance and the organic hydride using a gas will be described as a preferable example, but configurations for removing only one of the hydrogenation target substance and the organic hydride are also included in the present embodiment. For example, the gas introduction unit 70 introduces, as a predetermined gas, at least one selected from a group including air, nitrogen, argon, and helium, into the anolyte. More specifically, the gas introduction unit 70 causes bubbling of the anolyte using the predetermined gas. The gas introduction unit 70 includes a pump or an ejector, for example, as a mechanism for introducing a gas into the anolyte.

Introduction of a gas into the anolyte by the gas introduction unit 70 promotes gasification of the hydrogenation target substance and the organic hydride in the anolyte, thereby removing the hydrogenation target substance and the organic hydride from the anolyte. This can restrain the adsorption of the hydrogenation target substance and the organic hydride by the anode catalyst layer 152, and the corrosion of the anode catalyst layer 152 caused by oxides of the hydrogenation target substance and the organic hydride. The gasified hydrogenation target substance and organic hydride are discharged outside the system via the decomposition unit 46.

The gasification of the hydrogenation target substance and the organic hydride is also promoted partway by oxygen gas produced in the electrode reaction at the anode 150. However, the introduction of a gas by the gas introduction unit 70 can further promote the gasification of the hydrogenation target substance and the organic hydride, thereby removing more hydrogenation target substance and organic hydride from the anolyte more promptly. This can reduce the amount of oxides produced, thereby further restraining the deterioration of the anode catalyst layer 152.

As the hydrogenation target substance, toluene may be used, for example, as described previously. The solubility of toluene in the anolyte is up to about 500 mg/L. Toluene has a boiling point of 110.6 degrees C. and is relatively likely to gasify. However, when toluene is mixed into the anolyte, not a little toluene is electrolyzed and oxidized in the anode catalyst layer 152. Compounds produced by the electrolytic oxidation of toluene include benzyl alcohol, benzaldehyde, and benzoic acid. The boiling points of benzyl alcohol, benzaldehyde, and benzoic acid are 205 degrees C., 178.1 degrees C., and 249.2 degrees C., respectively, and, with the introduction of a gas by the gas introduction unit 70, it is difficult to remove such compounds from the anolyte.

However, by providing the gas introduction unit 70, more toluene can be promptly removed from the anolyte. Accordingly, the amount of toluene removed from the anolyte before electrode oxidation can be increased. As a result, the produced amount of oxides of toluene is reduced, thereby further restraining the deterioration of the anode catalyst layer 152. Other hydrogenation target substances and organic hydrides thought to be used in the organic hydride production apparatus 10 can also be removed from the anolyte using the gas introduction unit 70, by adjusting the temperature, humidity, and the like of the gas to be introduced, as needed. When adjusting the temperature and humidity of the gas, it is desirable to provide adjustment such as to allow a greater amount of hydrogenation target substance and organic hydride to dissolve in the gas rather than in the anode electrolyte.

At a predetermined position in the route for the anolyte, a gas is introduced from the gas introduction unit 70 into the anolyte. In the present embodiment, the gas introduction unit 70 is disposed such as to introduce the gas into the anode chamber 154. However, the configuration is not particularly limited thereto, and the gas introduction unit 70 may be connected to another position in the route for the anolyte instead of the anode chamber 154, such as the anolyte storage tank 40 and the circulation passage 44. Also, the gas introduction unit 70 may be connected to only one of the anode chamber 154, anolyte storage tank 40, and circulation passage 44, or may be connected to two or more thereof.

The concentration of the hydrogenation target substance and the organic hydride in the anolyte is higher in the anode catalyst layer 152 and the return part 44b than in the anolyte storage tank 40 and the outward part 44a, and is particularly higher in the anode catalyst layer 152. Accordingly, the gas from the gas introduction unit 70 may preferably be introduced into the anolyte in the anode chamber 154 or the return part 44b, and more preferably be introduced into the anolyte in the anode chamber 154. This can improve the efficiency of the removal of the hydrogenation target substance and the organic hydride from the anolyte.

When the gas is introduced into the anode chamber 154, the gas introduction unit 70 may preferably be connected to the downstream side of the anode catalyst layer 152 in the anolyte flow direction. This can more certainly avoid the situation in which the gas supplied from the gas introduction unit 70 inhibits the electrode reaction in the anode catalyst layer 152. Meanwhile, when the gas is introduced into the anolyte storage tank 40, the gas introduction unit 70 may preferably be connected to a bottom part of the anolyte storage tank 40. When the gas is introduced into the outward part 44a of the circulation passage 44, the gas introduction unit 70 may be connected to a suction part of the second liquid supply device 42.

The amount of the gas introduced from the gas introduction unit 70 may be set based on the amount per unit time of the hydrogenation target substance and the organic hydride shifted to the anode 150, for example. When the total shift amount of the hydrogenation target substance and the organic hydride per electrode area is about 0.01 mmol/(h·cm$^2$), for example, the introduction amount of the gas may preferably be 60 L/(h·cm$^2$) or greater. Also, the introduction amount of the gas may be, for example, equal to or more than the amount of oxygen gas produced in the electrode reaction at the anode 150, and equal to or less than 200 times the amount of oxygen gas produced. The introduction amount of the gas may preferably be adjusted such that the concentration of the hydrogenation target substance and organic hydride in the gas discharged from the decomposition unit 46 is the explosive limit concentration or less.

The gas introduction unit 70 may preferably include a porous member and introduce a gas into the anolyte via the porous member. Via such a porous member, the gas can be introduced in a state of fine bubbles into the anolyte. This can facilitate the gasification of the hydrogenation target substance and the organic hydride. The gas introduction unit 70 may also include a conventionally well-known agitation means, such as a propeller.

[Method for Producing Organic Hydride]

In a method for producing an organic hydride according to the present embodiment, an anolyte containing water is supplied to the anode catalyst layer 152 of the anode 150 described above. In the anode catalyst layer 152, protons are produced by electrolysis of water. The protons thus produced then pass through the electrolyte membrane 110 and move to the cathode 120 side. Also, a hydrogenation target substance is supplied to the cathode catalyst layer 122 of the cathode 120. In the cathode catalyst layer 122, the hydrogenation target substance is hydrogenated by the protons that have passed through the electrolyte membrane 110, so that an organic hydride is produced. In parallel with the production of the organic hydride, a predetermined gas is introduced from the gas introduction unit 70 into the anolyte, so that the hydrogenation target substance and the organic hydride that have passed through the electrolyte membrane 110 and been mixed into the anolyte are removed from the anolyte. The process of producing protons, the process of producing the organic hydride by the electrolytic reduction reaction, and the process of removing the hydrogenation target substance and the organic hydride from the anolyte occur in parallel at least at one point in time.

As described above, the organic hydride production apparatus 10 according to the present embodiment includes the electrolyte membrane 110, the cathode 120, the anode 150, and the gas introduction unit 70 for introducing a gas into the anolyte so as to remove the hydrogenation target substance and the organic hydride. The removal of the hydrogenation target substance and the organic hydride from the anolyte using the gas introduction unit 70 can restrain adsorption, by the catalyst, of the hydrogenation target substance and the organic hydride mixed in the anolyte, and corrosion of the catalyst caused by oxides of the hydrogenation target substance and the organic hydride.

As a result, functional deterioration of the anode catalyst layer 152 is restrained, so that increase in cell voltage can be avoided. Accordingly, the reduction reaction of the hydrogenation target substance in the cathode 120 can be made to proceed for a long period of time with lower electric power consumption rate. Therefore, the efficiency of organic hydride production can be improved. Also, the life of the anode catalyst layer 152 can be prolonged. Meanwhile, the present embodiment includes a configuration in which the anolyte is circulated between the anolyte storage tank 40 and the anode 150. Accordingly, the hydrogenation target substance and the organic hydride mixed into the anolyte is likely to accumulate in the anolyte storage tank 40. Therefore, the removal of the hydrogenation target substance and the organic hydride using the gas introduction unit 70 is particularly effective to improve the efficiency of organic hydride production and to prolong the life of the anode catalyst layer 152.

The method for producing an organic hydride according to the present embodiment includes: the process of supplying an anolyte to the anode catalyst layer 152 and producing protons by electrolysis of water in the anolyte; the process of supplying a hydrogenation target substance to the cathode catalyst layer 122 and hydrogenating the hydrogenation target substance with protons that have passed through the electrolyte membrane 110, so as to produce an organic hydride; and the process of introducing a predetermined gas into the anolyte to remove, from the anolyte, the hydrogenation target substance and the organic hydride that have passed through the electrolyte membrane 110 and been mixed into the anolyte. Accordingly, the organic hydride can be produced for a longer period of time, with higher efficiency. Even when only one of the hydrogenation target substance and the organic hydride is removed using a gas, the efficiency of organic hydride production can be improved and the life of the anode catalyst layer 152 can be prolonged, compared to the case where such removal is not performed.

The embodiment stated above is intended to be illustrative only, and the present invention is not limited thereto. It is to be understood that various changes and modifications, including design modifications, may be made based on the knowledge of those skilled in the art and that embodiments with such changes and modifications added are also within the scope of the present invention.

EXAMPLE

An example of the present invention will now be described by way of example only to suitably describe the present invention and should not be construed as limiting the scope of the invention.

Example 1

First, catalyst ink for the cathode catalyst layer was prepared by adding Nafion (registered trademark) Dispersion Solution DE2020 (made by E. I. du Pont de Nemours and Company) to powder of PtRu/C catalyst TEC61E54E (23% Pt by mass, 27% Ru by mass, made by TANAKA KIKINZOKU KOGYO K.K.) and by using a solvent as appropriate. An amount of Nafion (registered trademark) Dispersion Solution was added such that the ratio of the mass of Nafion after drying to the mass of carbon in the catalyst became 1:1. Also, as the electrolyte membrane, Nafion (registered trademark) 115 (thickness of 120 μm, made by E. I. du Pont de Nemours and Company) subjected to hydrophilic treatment was prepared. The catalyst ink thus obtained was applied to one main surface of the electrolyte membrane by spray coating. The catalyst ink was applied such that the total mass of Pt and Ru per electrode area became 0.5 mg/cm$^2$. Thereafter, the coated film was dried at 80 degrees C. to remove the solvent component in the catalyst ink, obtaining a laminated body of the cathode catalyst layer and the electrolyte membrane.

Subsequently, a cathode diffusion layer SGL35BC (made by SGL Carbon) cut out according to the shape of an electrode surface was attached to a surface of the cathode catalyst layer. The cathode catalyst layer and the cathode diffusion layer were then thermally bonded together for two minutes, at the temperature of 120 degrees C. and the pressure of 1 MPa. Accordingly, a complex constituted by the electrolyte membrane, the cathode catalyst layer, and the cathode diffusion layer was obtained.

Meanwhile, a carbon-based structure was prepared by molding with carbon/epoxy resin. The carbon-based structure corresponds to an assembly of the flow passage part 132, the spacer 126, and the separator 170a. On a surface of the carbon-based structure on the side corresponding to the flow passage part 132, multiple flow passages were formed. Each flow passage was formed into a linear shape with the width of 1 mm and the depth of 0.5 mm. The distance between adjacent flow passages was set to 1 mm. One end of each flow passage was connected to a liquid supply header that integrates the respective flow passages. The other end of each flow passage was connected to a liquid discharge header that also integrates the respective flow passages.

Also, as an anode base material, expanded mesh having the thickness of 1.0 mm, the short way of mesh of 3.5 mm, the long way of mesh of 6.0 mm, the width of 1.1 mm, and the aperture ratio of 42% was prepared. Dry blasting was performed on surfaces of the anode base material, and a cleaning process in 20 percent sulfuric acid aqueous solution was performed. Thereafter, using an arc ion plating apparatus and a titanium-tantalum alloy plate, 2-micrometer thick coating was formed on the surfaces of the anode base material, at the base material temperature of 150 degrees C. and the vacuum of $1.0 \times 10^{-2}$ Torr. To the anode base material with the coating, a mixed aqueous solution of iridium tetrachloride and tantalum pentachloride was applied. The anode base material was then placed in an electric furnace and subjected to heat treatment at 550 degrees C. By repeating the application of the solution and the heat treatment multiple times, an anode catalyst layer containing equimolar amounts of iridium oxide and tantalum oxide as catalysts was formed. The amount of the supported catalyst, in terms of the amount of Ir metal, per electrode area was 12 g/m$^2$.

Also, an elastic body obtained by processing a 0.3-milimeter thick titanium plate such that flat springs with a pitch of 10 mm were arranged was prepared as an anode supporting elastic body. On a surface of each flat spring in contact with the anode catalyst layer, a layer of a slight amount of platinum was formed. Further, an anode spacer and an anode separator were also prepared.

The carbon-based structure, complex, anode spacer, anode catalyst layer, anode supporting elastic body, and anode separator thus prepared were laminated in this order. The anode catalyst layer was fixed to the electrolyte membrane-side surface of the complex. The carbon-based structure was disposed such that each flow passage extended in a vertical direction when the organic hydride production apparatus was installed, and was fixed to the cathode diffusion layer-side surface of the complex. To one end of each flow passage, a supply passage for a hydrogenation target substance (corresponding to the outward part 34a of the circulation passage 34) was connected via the liquid supply header. Also, to the other end of each flow passage, a discharge passage for an organic hydride (corresponding to the return part 34b of the circulation passage 34) was connected via the liquid discharge header. Further, a supply passage for an anolyte (corresponding to the outward part 44a of the circulation passage 44) was connected to the anode chamber inlet in the anode spacer, and a discharge passage for the anolyte (corresponding to the return part 44b of the circulation passage 44) was connected to the anode chamber outlet in the anode spacer.

Pressing each layer using the anode supporting elastic body could create a state in which the layers are in close contact with each other. The distance between the electrolyte membrane and the anode catalyst layer was set to 0.05 mm. Through the processes set forth above, the organic hydride production apparatus of Example 1 was obtained. The active electrode area of the electrolysis cell was 12.3 cm$^2$.

In this organic hydride production apparatus, toluene as the catholyte was made to flow through the cathode chamber. Also, 100 g/L sulfuric acid aqueous solution as the anolyte was made to flow through the anode chamber. The flow rate of the catholyte was set to 0.6 mL/minute. Also, the flow rate of the anolyte was set to 5 mL/minute. At the temperature of 60 degrees C. and the current density of 40 A/dm$^2$, the electrolytic reaction was caused. The anolyte was supplied from the anolyte storage tank to the anode chamber using a pump, and then returned from the anode chamber to the anolyte storage tank to be circulated (batch operation). The anolyte was supplied through a lower part of the electrolysis cell to the anode chamber. Also, the anolyte was circulated while an amount of water reduced by electrolysis was supplemented.

Figure 3A:
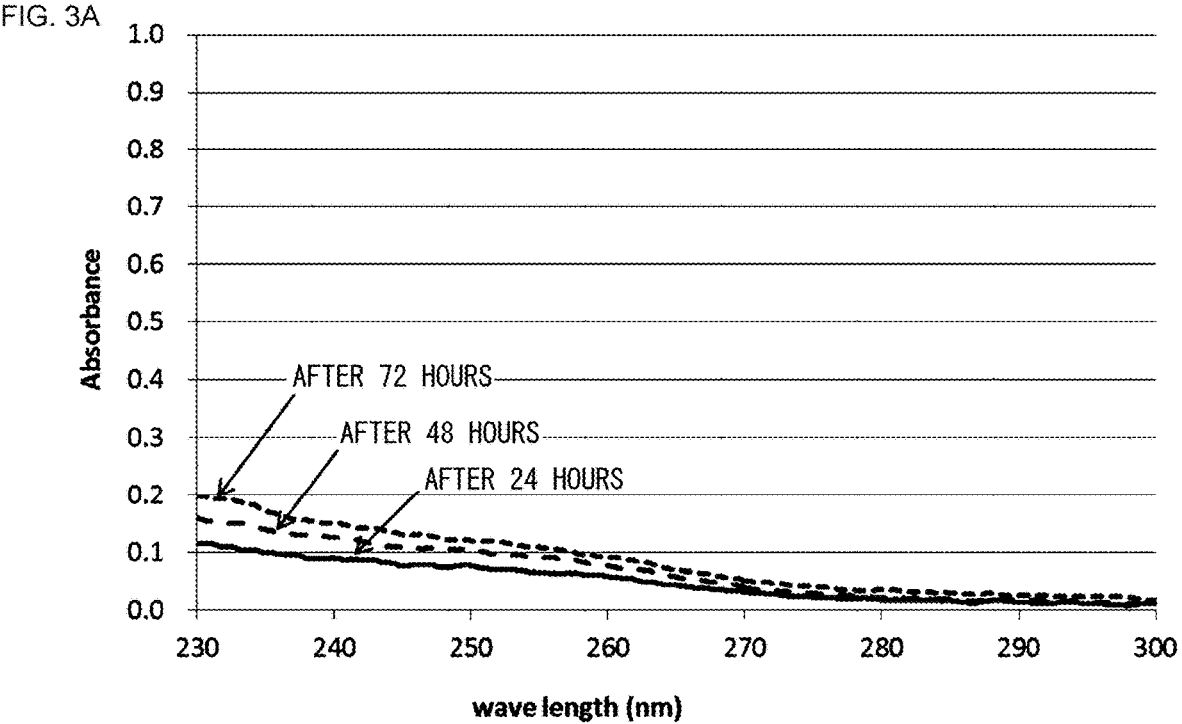
FIG. 3A is a diagram that shows absorption spectra of anolytes of which bubbling has been performed.

Also, to the anolyte storage tank, a gas introduction unit including a glass filter was connected. Through the glass filter, air was supplied to the anolyte storage tank for bubbling of the anolyte. The supply rate of air was set to 2.8 L/minute. After 24, 48, and 72 hours from the initiation of the electrolytic reaction, the anolyte was analyzed using an ultraviolet absorbance detector (from SHIMADZU CORPORATION). FIG. 3A shows the results.

Comparative Example 1

Figure 3B:
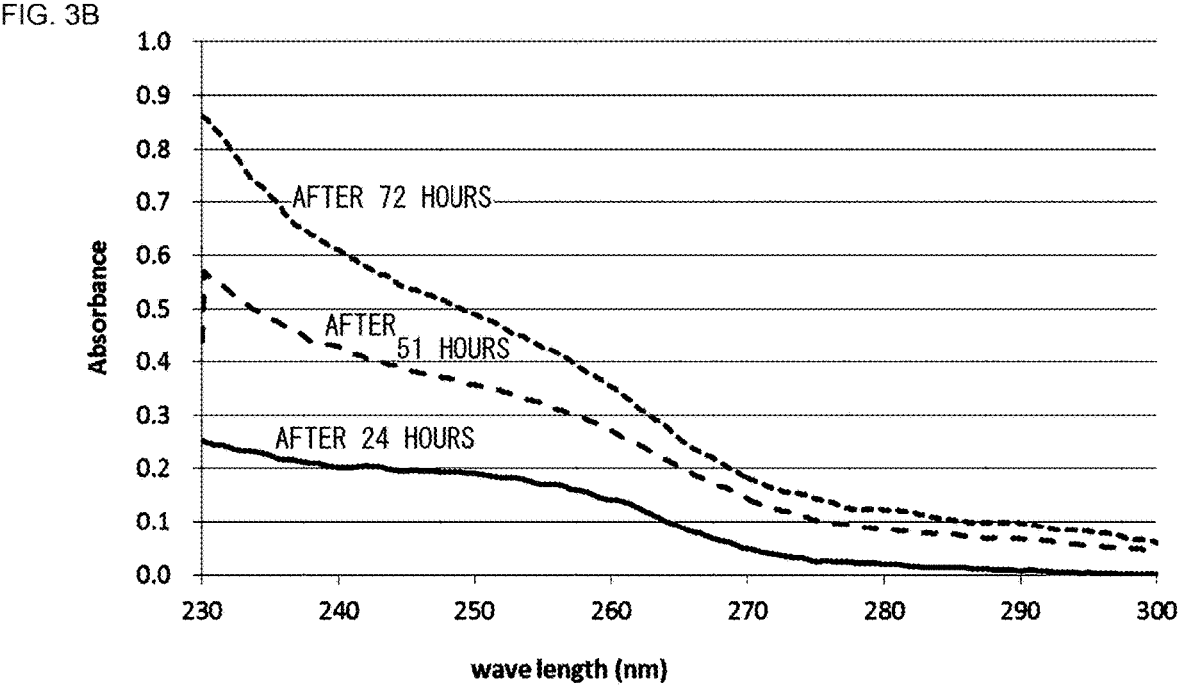
FIG. 3B is a diagram that shows absorption spectra of anolytes of which bubbling has not been performed.

Except that the gas introduction unit was not connected to the anolyte storage tank, an organic hydride production apparatus similar to that of Example 1 was obtained. Also, except that air was not supplied into the anolyte and bubbling was not performed, the electrolytic reaction was caused under the conditions same as those in Example 1. After 24, 51, and 72 hours from the initiation of the electrolytic reaction, the anolyte was analyzed using an ultraviolet-visible spectrophotometer (from SHIMADZU CORPORATION). FIG. 3B shows the results.

Figure 4A:
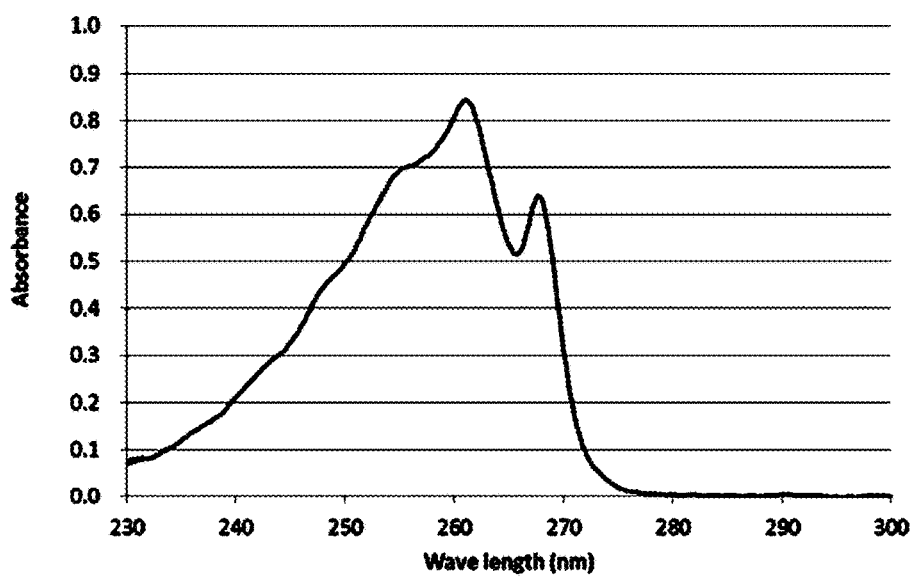
FIG. 4A is a diagram that shows an absorption spectrum of toluene.
Figure 4B:
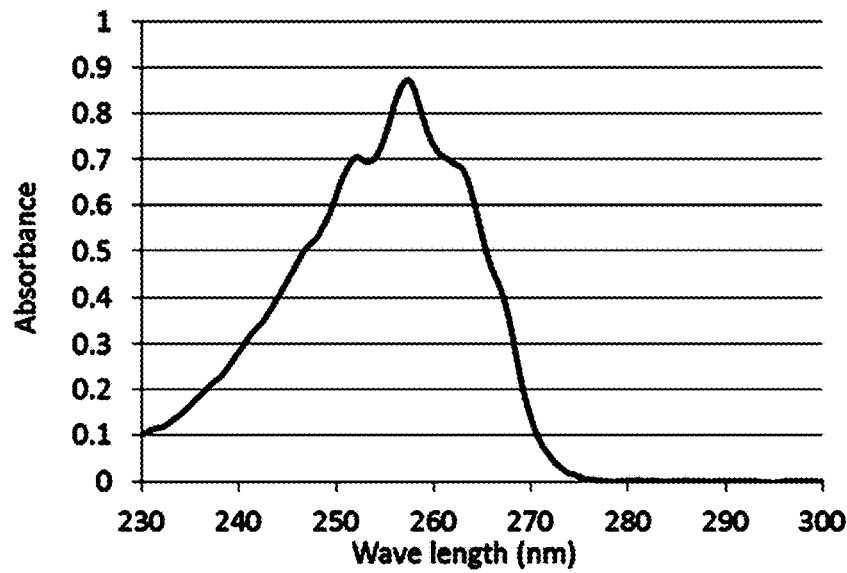
FIG. 4B is a diagram that shows an absorption spectrum of benzyl alcohol.
Figure 4C:
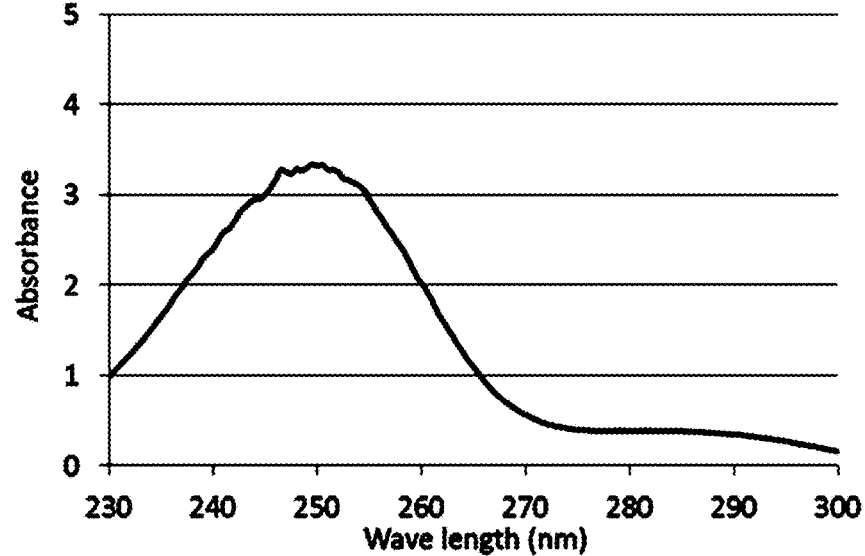
FIG. 4C is a diagram that shows an absorption spectrum of benzaldehyde.

FIG. 3A shows absorption spectra of the anolyte of which bubbling was performed. FIG. 3B shows absorption spectra of the anolyte of which bubbling was not performed. As shown in FIGS. 3A and 3B, regardless of whether or not bubbling was performed, an absorption spectrum corresponding to that of toluene (see FIG. 4A) was not detected. Meanwhile, absorption spectra considered to correspond to those of benzyl alcohol (see FIG. 4B) and benzaldehyde (see FIG. 4C), which are oxides of toluene, were detected.

When the absorption spectra considered to be derived from benzyl alcohol and benzaldehyde are compared in terms of whether or not bubbling was performed, the absorbance is higher when bubbling of the anolyte was not performed (FIG. 3B) than when bubbling of the anolyte was performed (FIG. 3A). This comparison shows that the amount of oxides of toluene included in the anolyte was larger when the bubbling was not performed than when the bubbling was performed. This means that the bubbling of the anolyte promptly removed toluene from the anolyte, thereby restraining production and accumulation of the oxides of toluene.

Meanwhile, in each of Example 1 and Comparative Example 1, the anolyte was extracted also after one hour from the initiation of the electrolytic reaction. Thereafter, the concentration of toluene included in the gas discharged from the anolyte was measured using detector tubes (No. 122, from GASTEC CORPORATION). The results were 2.8 ppm in Example 1 and 410 ppm in Comparative Example 1. This suggests that the bubbling of the anolyte promptly removed toluene. In terms of the cell voltage, any change according to whether or not bubbling was performed was not observed (2.2 V on average). Also, the electrolysis cell was operated for a long time in each of Example 1 and Comparative Example 1, and the consumption rate of iridium in the anode catalyst was measured using an X-ray fluorescence instrument (from Rigaku Corporation). The results were that, when the operation time was 1000-2000 hours, the consumption rate was 3% in Example 1 and 6% in Comparative Example 1. Thus, the catalyst consumption behavior improved by the bubbling can be ascertained.

Further, except that the mole ratio of iridium oxide to tantalum oxide included in the anode catalyst layer was set to 2:1, an organic hydride production apparatus similar to that of Example 1 or Comparative Example 1 was obtained. In the apparatus, an electrolytic reaction similar to that in Example 1 or Comparative Example 1 was caused. Also in this case, results similar to those in Example 1 and Comparative Example 1 were obtained.

Also, the effect of the bubbling of the anolyte on removal of toluene and oxides of toluene was tested. Multiple beakers containing pure water or 100 g/L sulfuric acid aqueous solution as the anolyte were prepared. The amount of the anolyte in each beaker was one liter. To each beaker, one of toluene, benzyl alcohol, benzaldehyde, and benzoic acid was added. The concentration of each organic substance was set to 500 ppm. Agitation was performed for five minutes to evenly disperse the organic substance. Also, as the gas introduction unit, an air pump including a porous silica-glass tube (with a tube inner diameter of 10 mm) was prepared, and the tip of the tube was inserted into a beaker. The temperature of the anolyte was set to 25 degrees C.

Figure 5A:
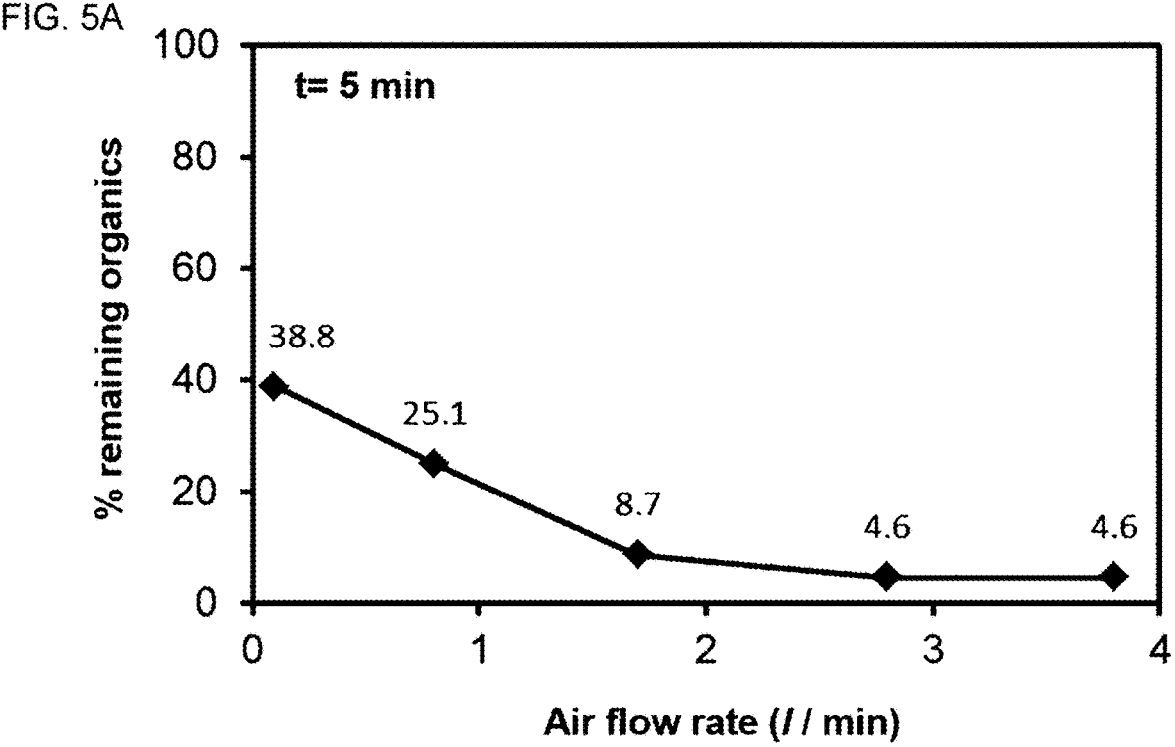
FIG. 5A is a diagram that shows relationships between the supply rate of air and the remaining percentage of toluene.

On an anolyte containing one liter of pure water with a toluene concentration of 500 ppm, bubbling was performed at multiple different air supply rates. The air supply rates were 0.1 L/minute, 0.8 L/minute, 1.7 L/minute, 2.8 L/minute, and 3.8 L/minute. At each air supply rate, bubbling was performed for five minutes. The concentration of residual toluene in the anolyte after bubbling in each case was measured using an ultraviolet-visible spectrophotometer (from SHIMADZU CORPORATION). Accordingly, the remaining percentage of toluene after bubbling was calculated. The remaining percentage is proportion of the amount of toluene after bubbling to the amount of toluene before bubbling. FIG. 5A shows the results. FIG. 5A shows relationships between the supply rate of air (unit: L/minute) and the remaining percentage of toluene (unit: %).

Figure 5B:
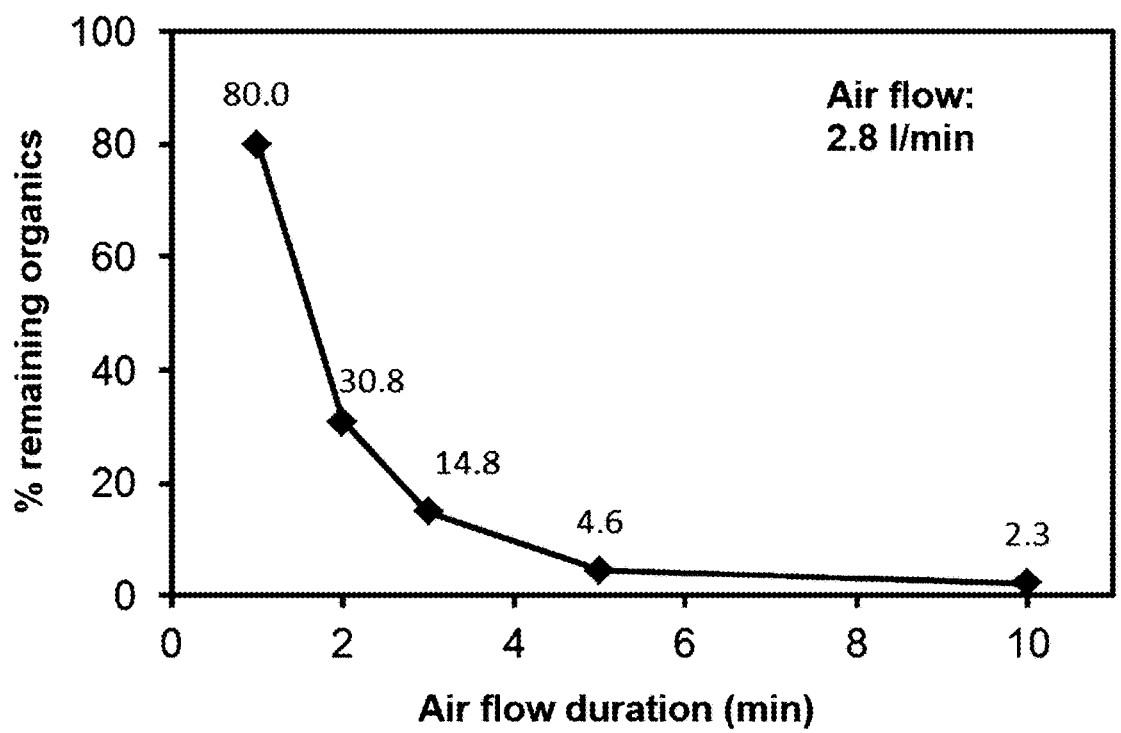
FIG. 5B is a diagram that shows relationships between the duration of air supply and the remaining percentage of toluene.

Meanwhile, on an anolyte containing one liter of pure water with a toluene concentration of 500 ppm, bubbling was performed at an air supply rate of 2.8 L/minute. After 1, 2, 3, 5, and 10 minutes from the initiation of the bubbling, the concentration of residual toluene in the anolyte was measured using an ultraviolet-visible spectrophotometer (from SHIMADZU CORPORATION). Accordingly, the remaining percentage of toluene after bubbling was calculated. FIG. 5B shows the results. FIG. 5B shows relationships between the duration of air supply (unit: minutes) and the remaining percentage of toluene (unit: %).

As shown in FIG. 5A, the remaining percentage of toluene tends to decrease when the supply rate of air is increased. Also, as shown in FIG. 5B, the remaining percentage of toluene tends to decrease also when the duration of bubbling is increased. It is ascertained that, with the bubbling for five minutes at 2.8 L/minute, 95% or more of toluene can be removed.

Figure 6A:
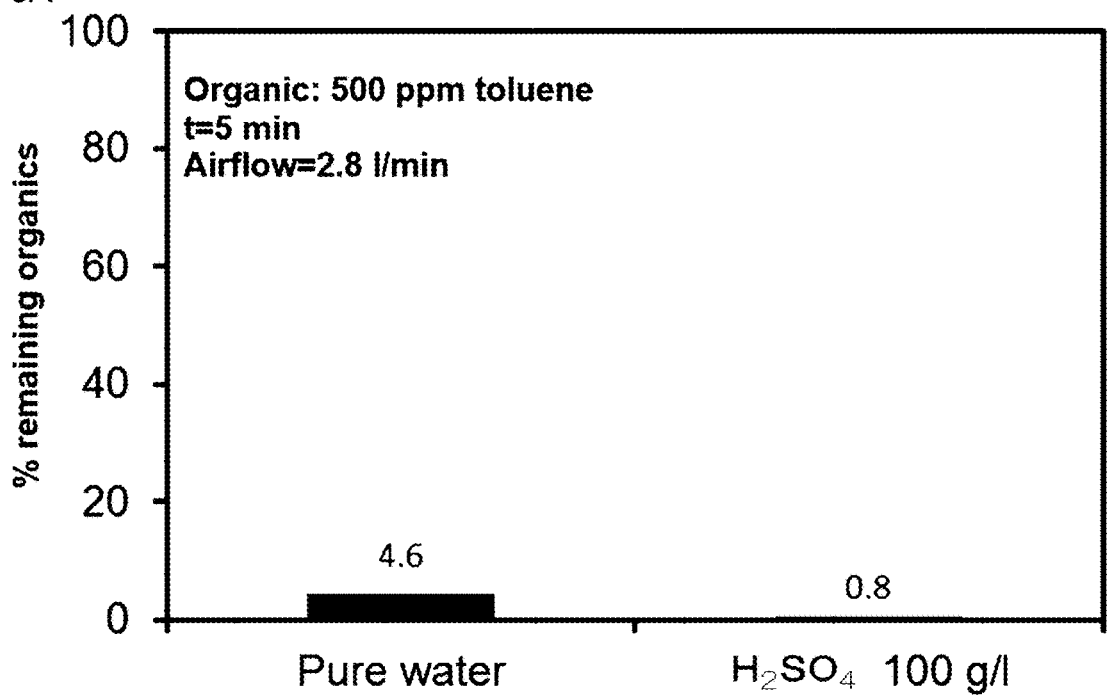
FIG. 6A is a diagram that shows remaining percentage of toluene in pure water and remaining percentage of toluene in a sulfuric acid aqueous solution.

Meanwhile, on an anolyte containing one liter of 100 g/L sulfuric acid aqueous solution with a toluene concentration of 500 ppm, bubbling was performed for five minutes at 2.8 L/minute, and the remaining percentage of toluene was calculated. FIG. 6A shows the result. FIG. 6A also shows the result of the anolyte containing one liter of pure water with a toluene concentration of 500 ppm. FIG. 6A shows the remaining percentage of toluene in pure water and the remaining percentage of toluene in sulfuric acid aqueous solution.

Figure 6B:
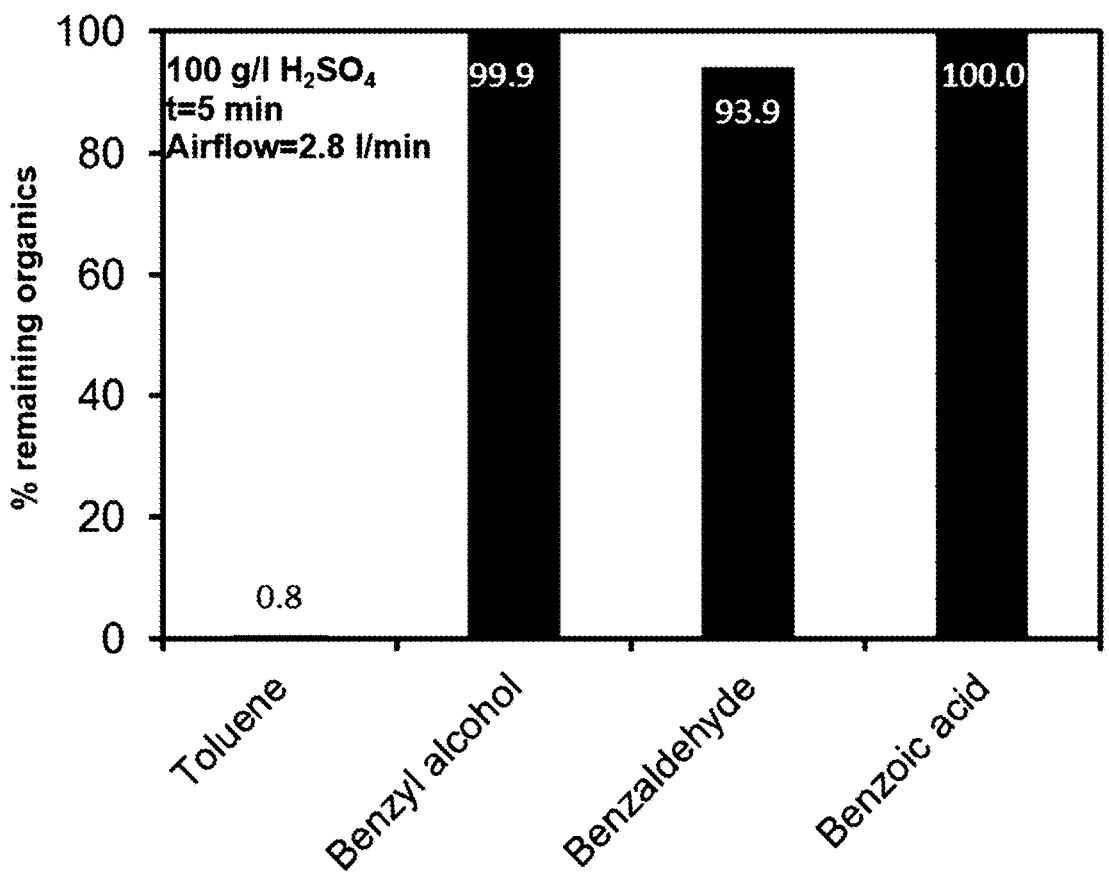
FIG. 6B is a diagram that shows remaining percentage of various organic substances in a sulfuric acid aqueous solution.

Also, on anolytes that each contain one liter of 100 g/L sulfuric acid aqueous solution with a concentration of one of benzyl alcohol, benzaldehyde, and benzoic acid of 500 ppm, bubbling was performed for five minutes at 2.8 L/minute, and the remaining percentage of each organic substance was calculated. FIG. 6B shows the results. FIG. 6B also shows the result of the anolyte with a toluene concentration of 500 ppm. FIG. 6B shows the remaining percentage of various organic substances in sulfuric acid aqueous solution.

As shown in FIG. 6A, a greater amount of toluene could be removed by bubbling from sulfuric acid aqueous solution, compared to the case of pure water. However, as shown in FIG. 6B, benzyl alcohol, benzaldehyde, and benzoic acid, i.e., oxides of toluene, could scarcely be removed by bubbling. This shows that removing toluene before it becomes an oxide by electrolytic oxidation is effective.

What is claimed is:

1. An organic hydride production apparatus, comprising:
   an electrolyte membrane having proton conductivity;
   a cathode, provided on one side of the electrolyte membrane, said cathode comprising a cathode catalyst layer;
   a cathode chamber that houses the cathode catalyst layer;
   an anode, provided opposite to the one side of the electrolyte membrane, said anode comprising an anode catalyst layer;
   an anode chamber that houses the anode catalyst layer and an anolyte comprising water;
   a gas introduction unit for introducing into the anolyte at a predetermined position a predetermined gas;
   a catholyte storage tank that stores a catholyte containing the hydrogenation target substance;
   a circulation passage that connects the catholyte storage tank and the cathode; and
   a separation unit that is provided in the circulation passage and separates, from the catholyte, hydrogen gas as a by-product produced in the cathode and the anolyte that has passed through the electrolyte membrane and been mixed into the catholyte,
   wherein the apparatus is arranged to:
   supply an organic hydrogenation target substance to the cathode and to hydrogenate the hydrogenation target substance at the cathode catalyst layer using protons to produce an organic hydride;
   supply the anolyte to the anode and to oxidize the water in the anolyte at the anode catalyst layer to produce protons; and
   remove at least one of the hydrogenation target substance and the organic hydride that have passed through the electrolyte membrane and been mixed into the anolyte by promoting gasification of the at least one of the hydrogenation target substance and the organic hydride through introduction of the predetermined gas at the predetermined position,
   wherein the gas introduction unit is configured to cause bubbling of the anolyte using the predetermined gas so as to remove the hydrogenation target substance or the hydrogenation target substance and the organic hydride that have passed through the electrolyte membrane and been mixed into the anolyte, and
   wherein the organic hydride production apparatus further comprises a decomposition unit that decomposes or adsorbs at least part of the hydrogenation target substance gasified in the predetermined gas, or decomposes or adsorbs at least part of the hydrogenation target substance and the organic hydride gasified in the predetermined gas.

2. The organic hydride production apparatus of claim 1, further comprising:
   an anolyte storage tank that stores the anolyte; and
   a circulation passage that connects the anolyte storage tank and the anode,
   wherein the gas introduction unit introduces the gas into the anolyte in at least one of the anode chamber, the anolyte storage tank, and the circulation passage.

3. The organic hydride production apparatus of claim 2, wherein the gas introduction unit introduces the gas into the anolyte in the anode chamber.

4. The organic hydride production apparatus of claim 1, wherein the predetermined gas is at least one selected from a group including air, nitrogen, argon, and helium.

5. The organic hydride production apparatus of claim 1, wherein when discharged from the decomposition unit, a concentration of the hydrogenation target substance in the predetermined gas is a predetermined value or less.

6. The organic hydride production apparatus of claim 1, wherein when discharged from the decomposition unit, a concentration of the hydrogenation target substance and the organic hydride gasified in the predetermined gas is a predetermined value or less.

\* \* \* \* \*